(12) United States Patent
Binzel et al.

(10) Patent No.: US 7,190,947 B2
(45) Date of Patent: Mar. 13, 2007

(54) PRIORITY E911 CALL BACK DURING ACCESS CLASS RESTRICTIONS

(75) Inventors: Charles Binzel, Bristol, WI (US); Marcia Otting, Mundelein, IL (US)

(73) Assignee: Motorola Inc., Schaumburg, IL (US)

( * ) Notice: Subject to any disclaimer, the term of this patent is extended or adjusted under 35 U.S.C. 154(b) by 0 days.

(21) Appl. No.: 10/360,296

(22) Filed: Feb. 7, 2003

(65) Prior Publication Data

US 2004/0176066 A1 Sep. 9, 2004

(51) Int. Cl.
*H04M 11/04* (2006.01)
*H04B 7/212* (2006.01)

(52) U.S. Cl. .................... 455/404.1; 370/444; 379/45

(58) Field of Classification Search ............ 455/404.1, 455/458, 565, 410, 521, 404, 417; 379/45, 379/38; 370/444; 340/7.51, 989; 702/188
See application file for complete search history.

(56) References Cited

U.S. PATENT DOCUMENTS

| | | | | |
|---|---|---|---|---|
| 5,914,675 | A * | 6/1999 | Tognazzini | 340/989 |
| 6,067,017 | A * | 5/2000 | Stewart et al. | 340/573.1 |
| 6,226,510 | B1 * | 5/2001 | Boling et al. | 455/404.2 |
| 6,282,429 | B1 * | 8/2001 | Baiyor et al. | 455/512 |
| 6,337,641 | B1 * | 1/2002 | Yoshioka et al. | 340/989 |
| 6,546,239 | B1 * | 4/2003 | Pazdersky et al. | 455/410 |
| 6,608,886 | B1 * | 8/2003 | Contractor | 379/45 |
| 6,665,534 | B1 * | 12/2003 | Conklin et al. | 455/417 |
| 6,678,514 | B2 * | 1/2004 | Wheeler et al. | 455/404.1 |
| 6,720,863 | B2 * | 4/2004 | Hull et al. | 340/7.51 |
| 6,766,159 | B2 * | 7/2004 | Lindholm | 455/404.1 |
| 2002/0019725 | A1 * | 2/2002 | Petite | 702/188 |
| 2002/0168958 | A1 * | 11/2002 | Ford et al. | 455/404 |
| 2003/0073424 | A1 * | 4/2003 | Nunally | 455/404 |
| 2003/0078029 | A1 * | 4/2003 | Petite | 455/404 |
| 2003/0091159 | A1 * | 5/2003 | Oxley | 379/38 |
| 2003/0109245 | A1 * | 6/2003 | McCalmont et al. | 455/404 |
| 2003/0216133 | A1 * | 11/2003 | Poltorak | 455/404.1 |
| 2004/0095954 | A1 * | 5/2004 | Varney et al. | 370/444 |
| 2004/0203572 | A1 * | 10/2004 | Aerrabotu et al. | 455/404.1 |

OTHER PUBLICATIONS

"3rd Generation Partnership Project; Technical Specification Group Services and System Aspects; Service accessibility (Release 4)", GSM Global System for Mobile Communications, V4.8.0 (2002), 14 pages.

* cited by examiner

*Primary Examiner*—William Trost
*Assistant Examiner*—Kiet Doan
(74) *Attorney, Agent, or Firm*—Joseph T. Cygan (57) ABSTRACT

An apparatus (100) and method (200) for enabling a wireless communication device operating during access class restrictions to receive an incoming emergency call for a predefined time period are provided. After the wireless communication device (100) makes an emergency call to an emergency service center such as police (216), the wireless communication device (100) is enabled to respond to a return call from the emergency service center (218). The wireless communication device accepts the return call based upon the emergency access class information (408) and the priority level (410) of the return call.

17 Claims, 7 Drawing Sheets

PRIORITY E911 CALL BACK DURING ACCESS CLASS RESTRICTIONS

FIELD OF THE INVENTION

The present invention generally relates to an apparatus and a method for receiving an emergency call, and more specifically to an apparatus and a method for receiving an emergency call during network access class restrictions.

BACKGROUND OF THE INVENTION

In today's Global System for Mobile Communications ("GSM") and Third Generation Partnership Project ("3GPP") systems for cellular telephone networks, a mobile telephone in a network is capable of placing an emergency call even when access for other calls are restricted by the network during a time of access class restrictions. The network may initiate access class restrictions for various reasons. For example, some base stations in an area may fail, which causes congestion, or there may exist a state of emergency such as an earthquake or a wide-spread fire where the network may deny access for normal calls and only allow access for emergency calls. The access is controlled by the network by assigning an access class in the range of 0 to 9 to all mobile telephones as described in the technical specification, 3GPP TS 22.011 V4.8.0 (2002-09). Access class 10 is signaled over the air by the network to mobile telephones indicating whether network access for emergency calls is allowed for mobile telephones with access classes 0 to 9. During a time of access class restrictions, the network prohibits mobile telephones belonging to the barred access classes from accessing the network to place and receive a call, although access to the network for emergency calls is allowed as long as access class 10 has not been barred by the network. However, having made the emergency call, the mobile telephone not belonging to one of the allowed access classes is still barred from receiving a call during the time of access class restrictions. For example, a call back from an emergency service provider is barred even though it is an emergency-related call.

DETAILED DESCRIPTION OF THE PREFERRED EMBODIMENTS

The present invention provides an apparatus and a method for receiving an incoming emergency call back in a wireless communication network during a time of network access control restrictions. During the network access control restrictions, all calls are barred except for calls to and from those mobile telephones belonging to allowed access classes, except for emergency calls initiated from a mobile telephone and incoming emergency calls back to that mobile telephone.

Figure 1:
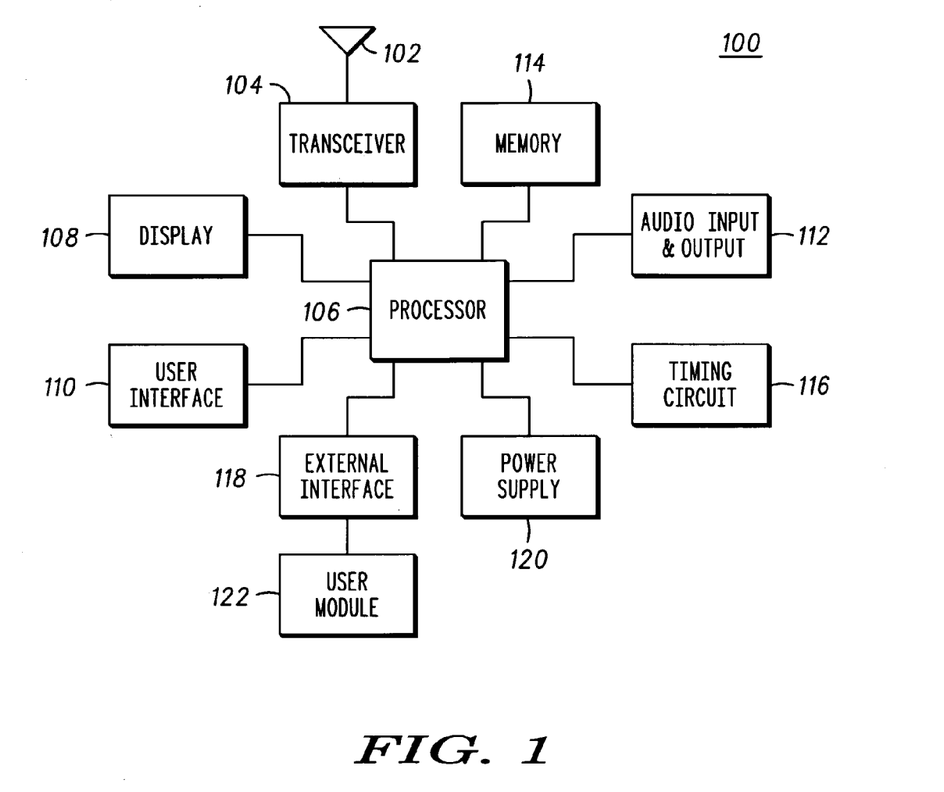
FIG. 1 is an exemplary block diagram of the present invention.

FIG. 1 is an exemplary block diagram of a wireless communication device 100 having emergency call back reception functionality in accordance with a preferred embodiment of the present invention. The wireless communication device 100 may be, but is not limited to, a radio-telephone such as a cellular phone or two-way radio, a paging device, a personal digital assistant ("PDA"), a hand-held computer, an audio/video device such as a television or an MP3 player, a network browsing device, a tablet for a pen, a touchpad for a finger or a pen, a touch keypad for a finger, a virtual pen, or any type of computing and communicating device. The wireless communication device 100 includes an antenna 102, a transceiver 104, a processor 106, a display 108, a user interface 110, an audio input and output 112, a memory circuit 114, and a timing circuit 116. Upon reception of wireless signals, the wireless communication device 100 detects the signals through the antenna 102 to produce detected voice and/or data signals. The transceiver 104, coupled to the antenna 102, converts the detected signals into electrical baseband signals and demodulates the electrical baseband signals to recover incoming information, such as voice and/or data, transmitted by the wireless signals. After receiving the incoming information from the transceiver 104, the processor 106 formats the incoming information for output to the display 108 and/or audio input and output 112. Likewise, for transmission of wireless signals, the processor 106 formats outgoing information and conveys it to the transceiver 104 for modulation of a carrier and conversion into modulated signals. The transceiver 104 conveys the modulated signals to the antenna 102 for transmission to a remote transceiver (not shown).

Input and output devices of the wireless communication device 100 may include a variety of visual, audio and/or motion devices. The output devices may include, but are not limited to, the display 108 and the audio outputs such as speakers, alarms and buzzers of the audio input and output 112. The display 108 may include liquid crystal displays, light emitting diode indicators, or any other displays. The input devices may include, but are not limited to, the user input 110 and audio inputs of the audio input and output 112. The user input 110 may include keyboards, key pads, selection buttons, touch pads, touch screens, capacitive sensors, motion sensors, switches, or any other user inputs. The audio input of the audio input and output 112 may include a microphone or any other audio input.

The internal components of the wireless communication device 100 further include the memory circuit 114 for storing and retrieving data and the timing circuit 116. The processor 106 may perform various operations to store, manipulate and retrieve information in the memory circuit 114.

Timing information regarding a predefined time period for which the wireless communication device 100 is able to receive the incoming call is stored in the memory circuit 114 along with duration information specifying how long the predefined time period has been in effect. The timing circuit 116 may include clock circuitry that provides the current time and/or a timer that provides elapsed time from a particular starting time such as the beginning of the duration of the predefined time period. It is to be understood that, for the invention described herein, the word "time" is used broadly to include calendar dates as well as times of day and other time periods.

The internal components of the wireless communication device 100 may further include a component interface 118 and a power supply 120. Accessories and additional components such as a user module 122 may be coupled to the component interface 118 to provide additional functionality and capabilities to the device 100. The power supply 120, such as a battery, is controlled by the processor 106, and provides power to the internal components so that they may function correctly.

The processor 106 compares the access class broadcast by the network to verify access class 10 is enabled before originating an emergency call. If the emergency call is assigned a channel for communication thereby gaining access to the network, the timing circuit 116 marks the channel assignment time as the start of the predefined time period and begins tracking the elapsed time. During the predefined time period, the processor 106 accepts an incoming page provided that the network is allowing access class 10. Unless the processor 106 determines that the elapsed time has exceeded the predefined time period, the processor 106 allows the incoming calls to be received while the network is operating with access class restrictions.

Figure 2:
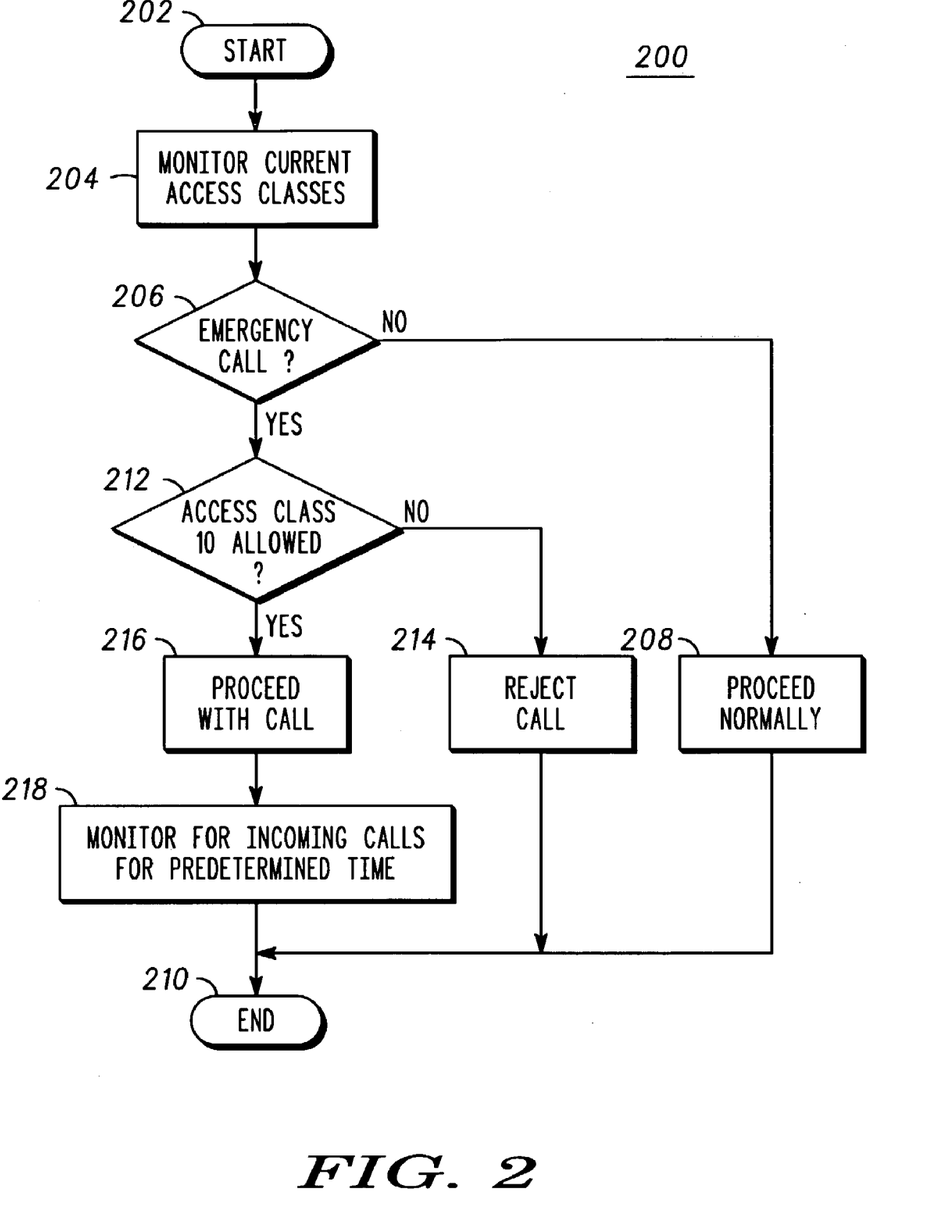
FIG. 2 is an exemplary flow chart of the first embodiment of the present invention in a wireless communication device.

FIG. 2 is an exemplary flow chart 200 outlining the operation of the wireless communication device 100 according to a first embodiment. The process begins in block 202, and the wireless communication device 100 monitors current access class setting in block 204. When a call is initiated, the wireless communication device 100 determines whether the call is an emergency call in block 206. If the call is not an emergency call, the wireless communication device 100 proceeds normally in block 208, and the process terminates in block 210. If the call is an emergency call, then the wireless communication device 100 determines whether access class 10 is currently allowed in block 212. If access class 10 is not allowed, then the wireless communication device 100 terminates the call by rejecting the call in block 214, and the process terminates in block 210. However, if the call is an emergency call and access class 10 is allowed, then the wireless communication device 100 connects the call in block 216. The wireless communication device 100 then begins to monitor for incoming calls for a predefined time period in block 218, and the process terminates in block 210.

Figure 3:
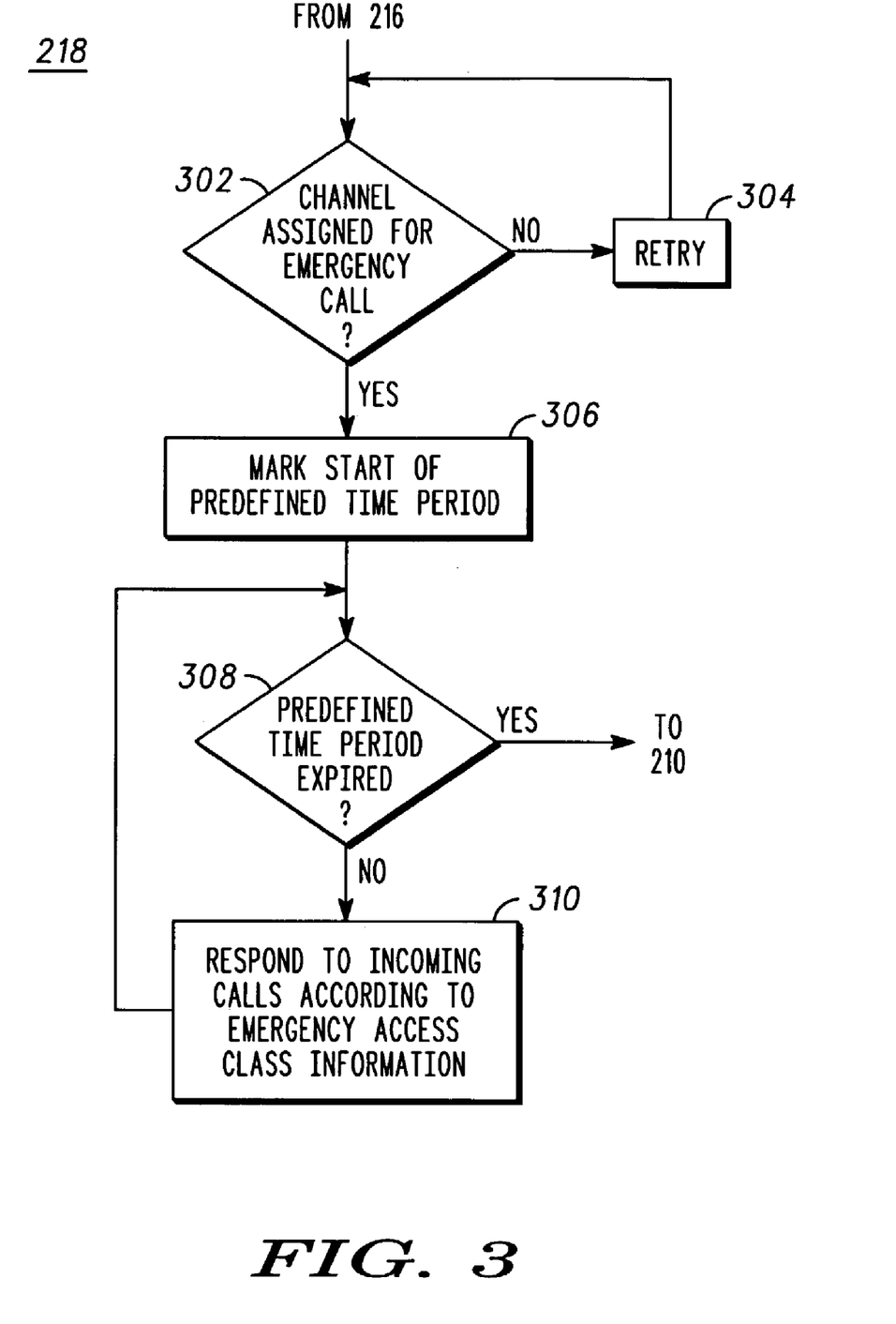
FIG. 3 is an exemplary flow chart describing one of the blocks of FIG. 2 according to a preferred embodiment.

FIG. 3 is an exemplary flow chart further describing block 218 of FIG. 2 according to a preferred embodiment. After the emergency call has been transmitted in block 216, the wireless communication device 100 monitors a channel assignment for the call in block 302, and may re-try the emergency call for a predetermined number of times in block 304 if no channel is assigned to the emergency call, i.e. if the call is unsuccessful. If the call is assigned a channel, then the wireless communication device 100 marks the beginning of the predefined time period, and starts tracking the elapsed time of the predefined time period in block 306. Whether the elapsed time has exceeded the predefined time period such as 45 minutes or a certain length in time otherwise provided is checked in block 308. If the elapsed time is within the predefined time period, the wireless communication device 100 continues to respond to incoming calls according to emergency access class in block 310, and continues to monitor the elapsed time in block 308. Upon expiration of the predefined time period, the wireless communication device 100 terminates the process in block 210. Monitoring of the elapsed time may be accomplished by using an internal clock of the wireless communication device 100 or receiving time information from an external time source such as a network time source. The predefined time period may be defined to run from the time the successful channel assignment is made or from the time the emergency call has terminated. The predefined time period may be renewed upon initiating a new emergency call to the emergency service provider, or upon receiving a call back from the emergency service provider.

Figure 4:
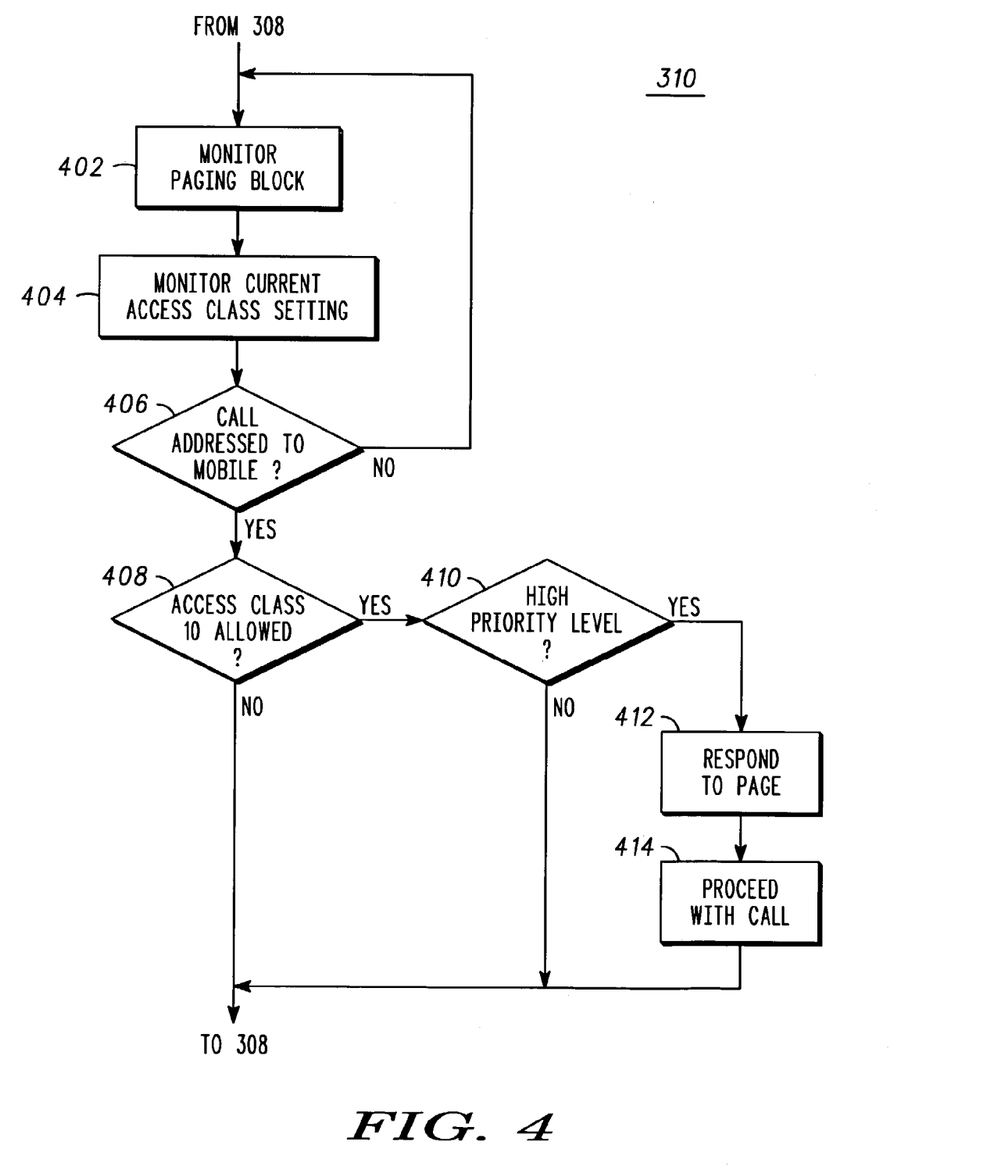
FIG. 4 is an exemplary flow chart describing one of the blocks of FIG. 3 according to a preferred embodiment.

FIG. 4 is an exemplary flow chart further describing block 310 of FIG. 3 according to a preferred embodiment. The wireless communication device 100 monitors an appropriate paging block for a page for an incoming call in block 402, and continues to monitor the current access class setting in block 404. If a page is detected, then the wireless communication device 100 determines whether the incoming call associated with the page is addressed to the wireless communication device 100 in block 406. If the incoming call is not addressed to the wireless communication device 100, then the process repeats from block 402. If the incoming call is addressed to the wireless communication device 100, then the wireless communication device 100 determines whether the access class 10 is currently allowed in block 408. If the access class 10 is not currently allowed, then the wireless communication device 100 does not respond to the page, and the process returns to block 308. If the access class 10 is currently allowed, the wireless communication device 100 determines whether the priority level of the incoming call, which may be indicated by information included in the page, is high in block 410. If the priority level is high, indicating that the incoming call is an emergency related call, then the wireless communication device 100 responds to the page in block 412, and processes the call in block 414. The process then returns to block 308. If the priority level is not high, then the wireless communication device 100 does not respond to the page, and the process returns to block 308. Alternatively, if the access class 10 is currently allowed, the wireless communication device 100 may first respond to the page, then determine whether the priority level of the incoming call is high by using information received after responding to the page. If the priority level is high, then the wireless communication device 100 processes the call, and then the process returns to block 308. If the priority level is not high, then the process returns to block 308 without processing the call.

Figure 5:
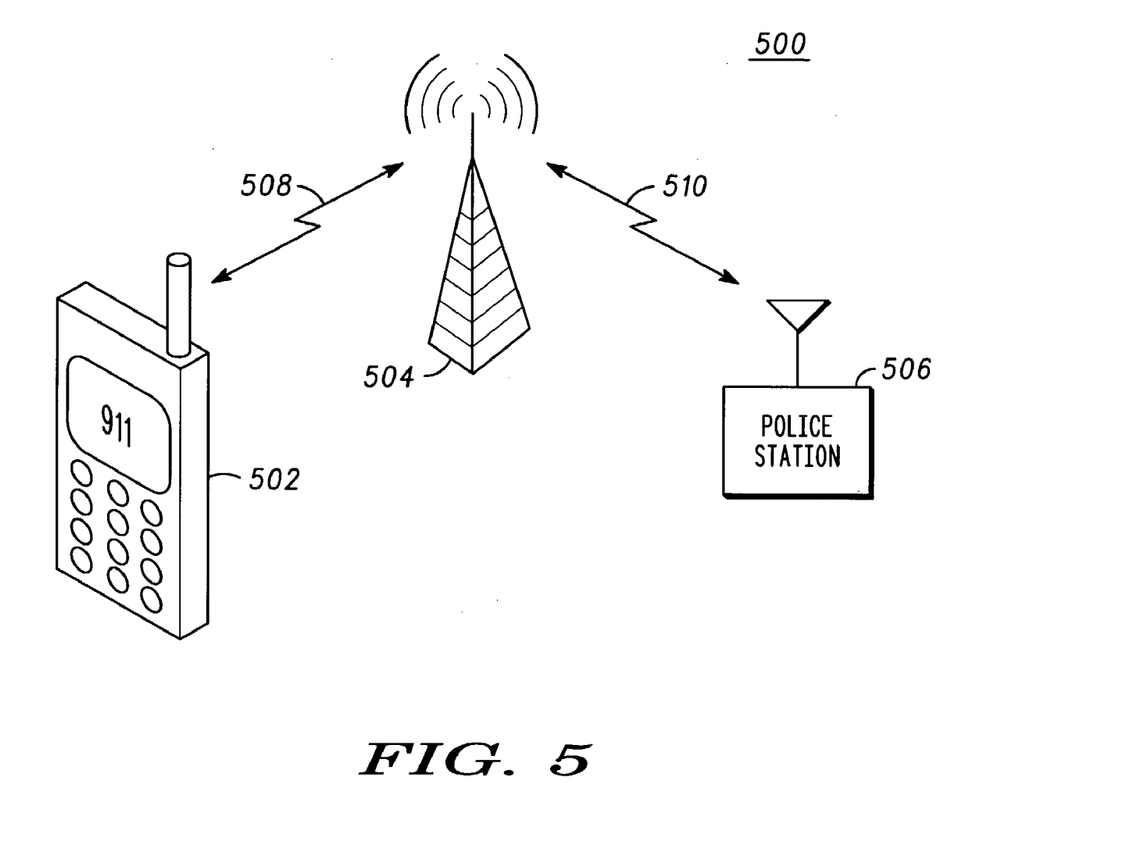
FIG. 5 is an exemplary block diagram of an environment where the present invention may be practiced.

FIG. 5 is an exemplary block diagram of an environment where the present invention may be practiced according to a preferred embodiment. In the exemplary environment, there exists a wireless communication network 500 comprising a wireless communication device 502, a base station 504, and an emergency service center 506, all of which may be connected wirelessly as shown with radio frequency signal 508 and 510.

Figure 6:
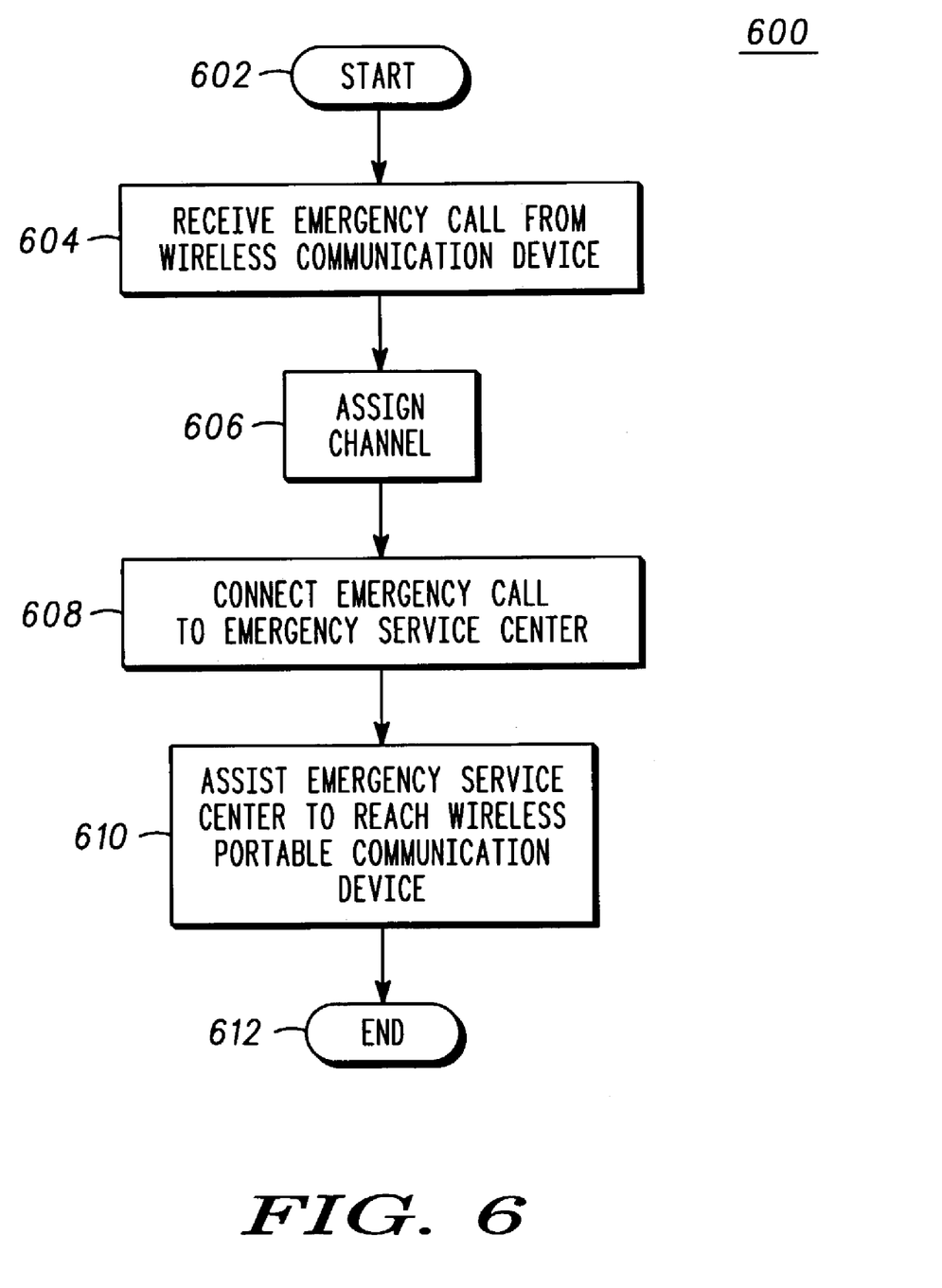
FIG. 6 is an exemplary flow chart of the second embodiment of the present invention in a wireless communication network.

FIG. 6 is an exemplary flow chart 600 outlining the operation of the wireless communication network 500 of FIG. 5 according to a preferred embodiment. The process begins in block 602. The network 500 receives an emergency call from the wireless communication device 502 in block 604, and the network 500 assigns a channel for the emergency call in block 606. The network 500 then establishes the emergency call to the emergency service center 506 in block 608, and as the communication between the wireless communication device 502 and the emergency service center 504 is established, the network assists the emergency service center 504 for a return call to the wireless communication device 502 by providing a telephone number associated with the wireless communication device 502 in block 610. The process then terminates in block 612.

Figure 7:
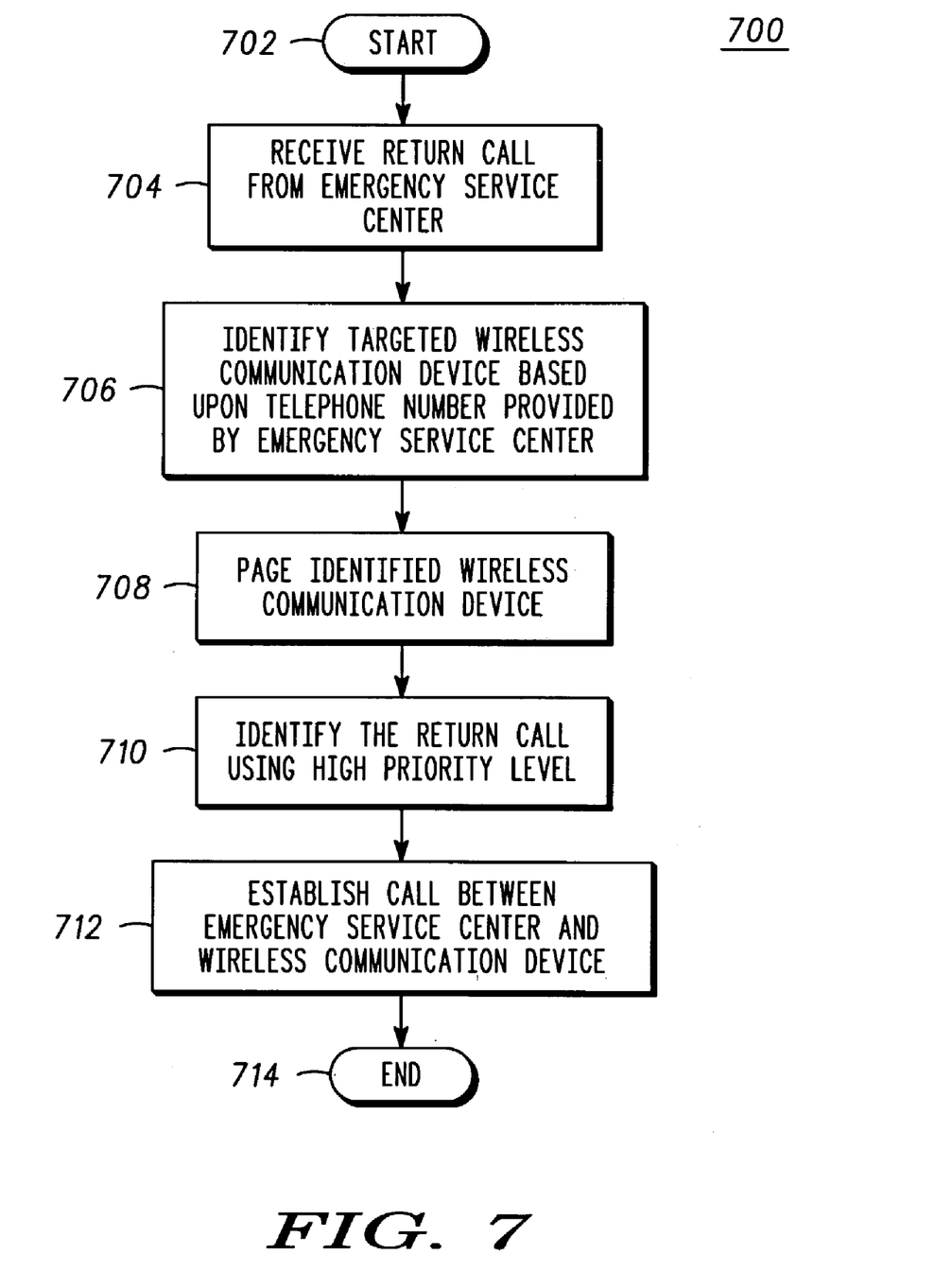
FIG. 7 is an exemplary flow chart describing a return call from an emergency service center to the wireless communication device.

FIG. 7 is an exemplary flowchart 700 describing a call back process from the emergency service center 506 to the wireless communication device 502. The process begins in block 702. The network 500 during access control restriction receives a return call having a telephone number, which identifies the wireless communication device 502, from the emergency service center 506 in block 704 after the emergency call from the wireless communication device 502 has been terminated. By using the telephone number provided by the emergency service center 506, the network identifies the targeted wireless communication device 502 in block 706 as the wireless communication device which made the initial emergency call, and pages the identified wireless communication device 502 in block 708. The network 500 also identifies the return call from the emergency service center 506 with priority level, which is set to high for being originated from the emergency service center in block 710. The network 500 then establishes communication between the emergency service center 506 and the wireless communication device 502 in block 712. Either the network 500, or the wireless communication device 502 may track the elapsed time for the predefined time period. The process terminates in block 714.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A wireless communication device comprising:
   a receiver configured to receive information about allowed access classes;
   a processor coupled to the receiver, the processor configured to determine whether an emergency access class is allowed; and
   a transmitter coupled to the processor, the transmitter configured to transmit an emergency call after the emergency access class is determined to be allowed,
   wherein the processor is configured to accept an incoming emergency call for a predefined time period after the transmission of the emergency call, further comprising:
   a timing circuit coupled to the processor, the timing circuit configured to generate a start time of the predefined time period and to provide timing information to the processor; and
   a memory circuit configured to store the start time, wherein the processor determines whether the predefined time period has elapsed based upon comparison between the start time in the memory circuit and the timing information received from the timing circuit, wherein
   the timing circuit is configured to generate the start time upon receipt of a channel assignment.

2. The wireless communication device of claim 1, wherein the processor is configured to monitor a channel assignment for the emergency call.

3. The wireless communication device of claim 2, wherein the processor responds to a page using emergency access class information in the page after the transmission of the emergency call.

4. The wireless communication device of claim 3, wherein the processor accepts the incoming emergency call by determining whether the incoming emergency call has an appropriate priority level.

5. The wireless communication device of claim 1, wherein the timing circuit is configured to provide the timing information based upon an external time reference.

6. The wireless communication device of claim 1, wherein the timing circuit is configured to generate the start time upon the termination of the emergency call.

7. The wireless communication device of claim 1, wherein the timing circuit is configured to reset the start time after the initiation of another emergency call.

8. The wireless communication device of claim 1, wherein the timing circuit is configured to reset the start time upon the reception of the incoming emergency call.

9. A method in a wireless communication device comprising:
   monitoring a plurality of allowed access classes;
   determining whether an emergency access class is allowed;
   transmitting an emergency call upon determining that the emergency access class is allowed; and
   responding to paging for an incoming emergency call for a predefined time period after the transmission of the emergency call, wherein
   responding to paging for an incoming emergency call for a predefined time period after the transmission of the emergency call further comprises:
   monitoring whether the emergency call is assigned a channel; and responding to the paging after the emergency call has been assigned a channel, wherein
   responding to paging after the emergency call has been assigned a channel further comprises:
   monitoring a plurality of currently allowed access classes; determining whether the emergency access class is currently allowed; and
   responding to the paging upon determining that the emergency access class is allowed.

10. The method of claim 9, further comprising completing the incoming emergency call upon determining that the incoming emergency call has an appropriate priority level.

11. The method of claim 10, wherein responding to paging for a predefined time period after the transmission of the emergency call further comprises:
    storing a start time stamp indicating a start of the predefined time period in memory;
    tracking an elapsed period of time from the start time stamp; and
    responding to the paging during the predefined time period.

12. The method of claim 11, wherein tracking an elapsed period of time from the start time stamp by monitoring an internal clock.

13. The method of claim 11, wherein tracking an elapsed period of time from the start time stamp by monitoring an external time reference.

14. The method of claim 11, wherein using receipt of the channel assignment as the start of the predetermined period of time.

15. The method of claim 11, further comprising using the termination of the emergency call as the start of the predetermined period of time.

16. The method of claim 11, further comprising resetting the start time stamp each time an emergency call is made from the wireless communication device.

17. The method of claim 11, further comprising resetting the start time stamp each time an incoming emergency call is completed.

* * * * *